United States Patent
Sharma et al.

(10) Patent No.: US 10,862,973 B2
(45) Date of Patent: Dec. 8, 2020

(54) WEB ARCHITECTURE FOR SERVICING INTERDEPENDENT PROCESSES ON MOBILE DEVICES

(71) Applicant: Verizon Patent and Licensing Inc., Arlington, VA (US)

(72) Inventors: Dheeraj Sharma, Coppell, TX (US); Tushar Preet Singh, Flower Mound, TX (US); David Hsu, Addison, TX (US); Kalaichelvi Easwaran, Irving, TX (US); Michael Hekl, Plano, TX (US); Pranay Bajpai, Flower Mound, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 428 days.

(21) Appl. No.: 15/475,295

(22) Filed: Mar. 31, 2017

(65) Prior Publication Data
US 2018/0288164 A1   Oct. 4, 2018

(51) Int. Cl.
*H04L 29/08* (2006.01)
*H04W 88/02* (2009.01)
*H04L 29/06* (2006.01)
*H04W 84/04* (2009.01)

(52) U.S. Cl.
CPC ............ *H04L 67/141* (2013.01); *H04L 67/02* (2013.01); *H04L 67/04* (2013.01); *H04L 67/2823* (2013.01); *H04L 67/42* (2013.01); *H04W 84/042* (2013.01); *H04W 88/02* (2013.01)

(58) Field of Classification Search
CPC ................................ H04L 67/02; H04L 67/04
See application file for complete search history.

(56) References Cited

U.S. PATENT DOCUMENTS

| | | | | |
|---|---|---|---|---|
| 8,554,190 B2* | 10/2013 | Smith | ..................... | H04W 4/60 455/418 |
| 2008/0003996 A1* | 1/2008 | Strandell | ............... | H04L 67/125 455/420 |
| 2011/0238792 A1* | 9/2011 | Phillips | ................. | G06F 15/177 709/220 |
| 2015/0350410 A1* | 12/2015 | Weiss | ................ | H04M 1/72577 455/418 |

* cited by examiner

*Primary Examiner* — Adnan M Mirza

(57) ABSTRACT

A web server sends a first coordinator to a first browser of a first mobile device. The first coordinator is a set of instructions executable by the first browser. The web server also sends a second coordinator to a second browser of a second mobile device. The second coordinator is a set of instructions executable by the second browser. The first coordinator, when executed by the first browser, cause the first browser to: send a first request for information to the second browser, over the web server; wait until the requested information is received from the second coordinator over the web server; and when the requested information is received from the second coordinator, perform a first action based on the requested information received from the second coordinator. The first request includes a first token, and the requested information includes a next token.

20 Claims, 10 Drawing Sheets

WEB ARCHITECTURE FOR SERVICING INTERDEPENDENT PROCESSES ON MOBILE DEVICES

BACKGROUND INFORMATION

A network service provider may offer a variety of communication services (e.g., an Internet service, email services, telephone service, texting service, Voice-over-Internet Protocol (VoIP) service, content delivery service, etc.) and products (e.g., phones, accessories, etc.). In some instances, a service provider may bundle the services with products.

In recent years, with the advent of smart devices, service providers have equipped their sales representatives with tablet computers. With such a device at hand, a sales representative can interact with the customer while using the device to access the corporate database for information necessary to make a sale or sign up the customer to a particular service. However, current systems still are not well adapted for fully engaging the customers.

For example, in one system, a customer may view a product on the mobile device of a sales rep only after the customer makes the purchase. In another example, because the system is designed for sales representatives and not for customers, the system may not show an appropriate breakdown of a projected bill (e.g., tax, applied promotions) before the customer makes the purchase.

DETAILED DESCRIPTION OF PREFERRED EMBODIMENTS

The following detailed description refers to the accompanying drawings. The same reference numbers in different drawings may identify the same or similar elements.

Given a typical web service (e.g., online purchase of a product), a web server provides a series of content to a browser as the transaction progresses through various stages. The service assumes a one-to-one transaction (i.e., a server-browser transaction). However, in some situations, it may be desirable to have the web server interact with multiple browsers that communicate with one another. For example, assume that a sales rep is interacting with a customer in person. In such a case, a process running within a browser of a tablet computer held by the sales rep should receive, process, and make available to the sales rep a type of information that is different from the type information that should be received, processed, and made available to the customer. Although the sales rep and the customer may need access to some identical information (e.g., what products/services are available to the customer), the web server should not treat the sales rep and the customer identically. Furthermore, because the sales rep and the customer are communicating in-person, a program that is running on the tablet computer (e.g., a program for making a sale) should be coordinated or synchronized to a program that is running on the mobile device of the customer (e.g., a program tailored to the customer for making a purchase).

In the following, a web server (components (and additional components for rendering web services) service multiple, interdependent, remote processes that are running on different mobile devices. Each of the processes is tailored to a particular type of user (e.g., a sales rep, a customer, a tutor, a student, etc.). In addition, the web server supports coordination or synchronization of the processes through receiving, storing and dispensing different tokens for different stages of the processes.

Figure 1:
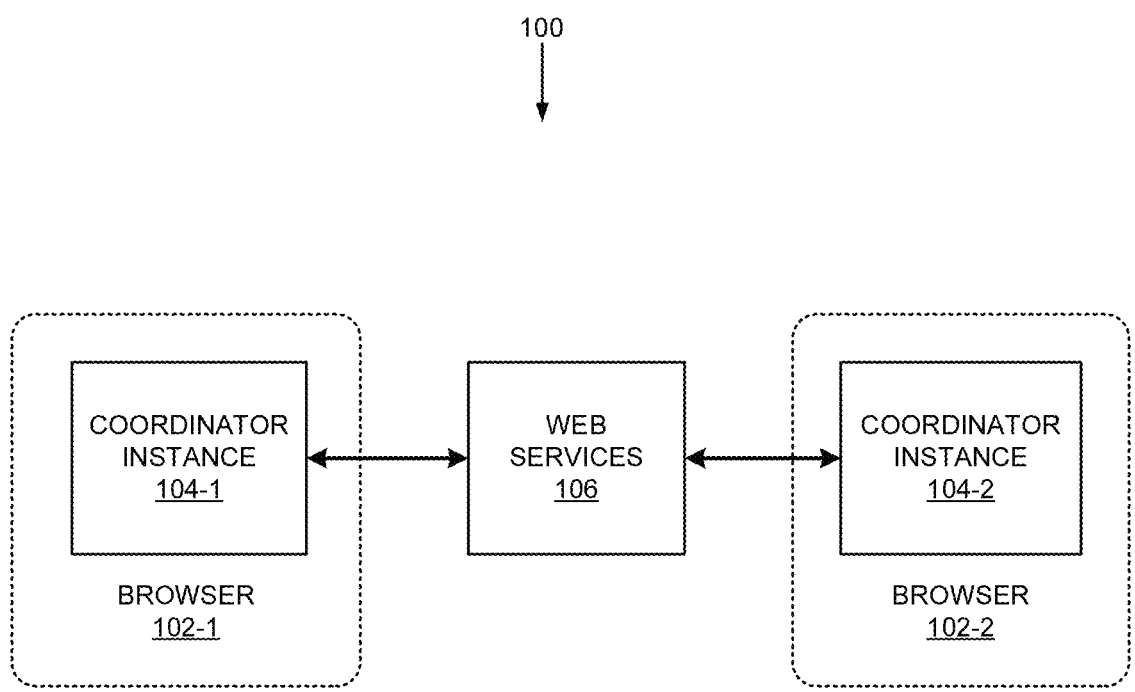
FIG. 1 illustrates an overview of the concepts described herein.

FIG. 1 illustrates an overview of the concepts described herein. As shown, a system 100 includes browsers 102-1 and 102-2 and web services 106 running on different devices. Web services 106 may include typical services that are provided by a combination of web server and related components (e.g., a web container, database, etc.).

After browser 102-1 is instantiated, browser 102-1 downloads from web services 106 a copy of a coordinator program (e.g., a web page, a script, etc.), which browser 102-1 uses to create a coordinator instance 104-1 (also referred to as "coordinator 104-1"). Browser 102-2 operates similarly as browser 102-1, downloading its own copy of a coordinator program (different from the coordinator program uploaded by browser 102-1) and creating a coordinator instance 104-2 (also "coordinator 104-2").

Coordinators 104-1 and 104-2 perform, respectively, procedures P1 and P2, each of which is tailored to a particular type of users of mobile devices. Although P1 and P2 run on different mobile devices, because P1 and P2 are interdependent, procedures P1 and P2 communicate with one another by using an inter-process signaling mechanism, as described in detail below. In some implementations, the inter-process signaling is performed based on a series of tokens.

More specifically, to ensure that coordinator 104-1 is synchronized with coordinator 104-2, whenever coordinator 104-1 has a pending task (one of many tasks in P1) that depends on a completion of a task being performed by coordinator 104-2, coordinator 104-1 waits for coordinator 104-2 to signal the completion. Coordinator 104-2 does so by posting a token to web services 106. If the token is posted to web services 106, coordinator 104-1 is able to access the token and recognize that coordinator 104-2. In another example, a tutor and a student may have different informational requirements. Although the tutor and the student may share some information (e.g., homework assignment), information displayed on the tutor's mobile device (e.g., teaching material) may be different than information shown on a mobile device of the student. Again, there is a difference between information requirements for tutors and their students. Furthermore, because the tutor and the student interact in-person, a process that is running on the mobile device of the tutor (e.g., a program for generating multiplication problems and their answers) should be synchronized to a process that is running on a mobile device of the student (e.g., a program for generating multiplication problems without showing the answers).

as completed its task. When the token is available to coordinator 104-1 for a read operation, coordinator 104-1 may then proceed with its pending task.

Similarly, whenever coordinator 104-2 has to perform a pending task that depends on the completion of a task being performed by coordinator 104-1, coordinator 104-2 waits for coordinator 104-2 to signal its completion. Coordinator 104-1 does so by posting a token to web services 106. When the token is posted by coordinator 104-1 and is available for reading by coordinator 104-2, coordinator 104-2 may proceed with its pending task.

Accordingly, during performances of P1 and P2, coordinators 104-1 and 104-2 may exchange, over web services 106, a series of tokens with one another to synchronize interdependent processes P1 and P2.

System 100 may be applied to a wide range of situations. For example, system 100 may be adapted to facilitate transactions between a sales rep and a customer, a tutor and a student, game players with different roles, and/or any other processes in which multiple, involved parties have different informational requirements and their actions must be synchronized or coordinated with one another. A more detailed description of system 100 adapted for sales rep/customer (i.e., POS telesales) is provided below with respect to FIGS. 5A through 8B.

Figure 2:
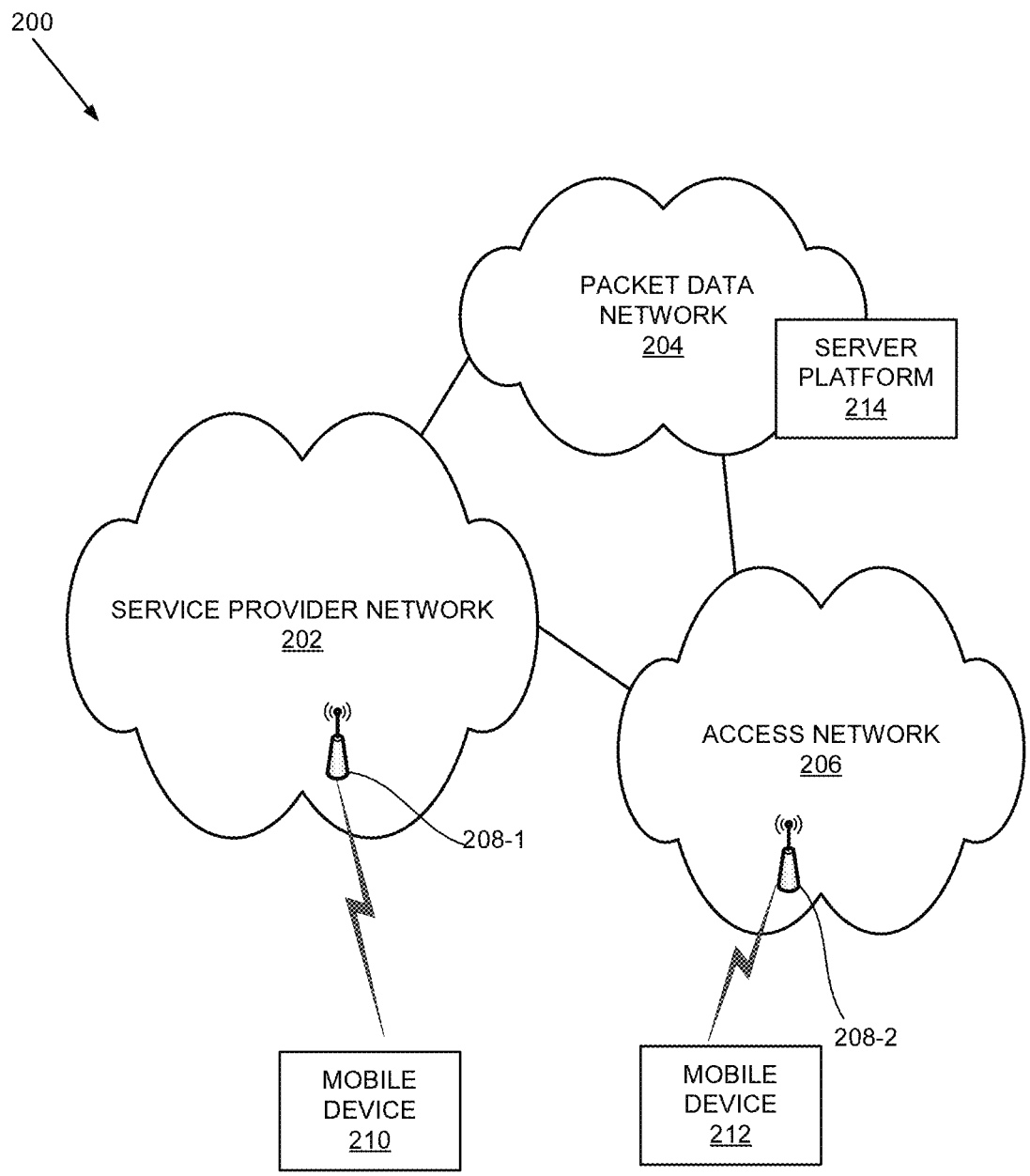
FIG. 2 illustrates an exemplary environment in which the concepts illustrated in FIG. 1 may be implemented.

FIG. 2 illustrates an exemplary environment 200 in which the concepts illustrated in FIG. 1 may be implemented. As shown, environment 200 includes a service provider network 202, access network 204, packet data network 206, mobile devices 210 and 212, and a server platform 214.

Service provider network 202 and access network 204 may include one or more networks of any type, such as, for example, a local area network (LAN), a wide area network (WAN), and a wireless satellite network, and/or one or more wireless public land mobile networks (PLMNs). The PLMN(s) may include a Code Division Multiple Access (CDMA) 2000 PLMN, a Global System for Mobile Communications (GSM) PLMN, a Long Term Evolution (LTE) PLMN and/or other types of PLMNs not specifically described herein.

Service provider network 202 and/or access network 204 may include base stations 208-1 and 208-2 through which mobile devices 210 and 212 connect to provider network 202 and/or access network 204.

Packet data network (PDN) 206 may include a network that supports Internet Protocol (IP)-based communications. PDN 206 may include, for example, an IP Multimedia Subsystem (IMS) network, which may provide voice and multimedia services to user device 102 based on Session Initiation Protocol (SIP). As shown, PDN 206 includes server platform 214.

Mobile devices 210 and 212 may each have communication capabilities. For example, mobile device 210/212 may include a cellular phone, a smart phone, a wearable computer (e.g., a wrist watch, eye glasses, etc.), a tablet, a set-top box (STB), a mobile phone of another type, any type of internet protocol (IP) communications device, a voice over internet protocol (VoIP) device, a laptop computer, a gaming device, a media player device, or a digital camera that includes communication capabilities (e.g., wireless communication mechanisms).

According to one implementation, mobile devices 210 and 212 may include browsers 102-1 and 102-2. The browsers on mobile devices 210 and 212 may run interdependent processes or procedures that are synchronized to one another to facilitate a particular transaction. Each of the processes may be tailored to a particular user type. For example, in one implementation, mobile device 210 may be a tablet computer, and the browser on mobile device 210 may run a program tailored to a sales rep. On the other hand, mobile device 212 may be a smart phone of a customer. The browser on mobile device 212 may run a program tailored to a customer who wants to make a purchase. The programs tailored to the sales rep and the customer, running on mobile devices 210 and 212, would be synchronized through server platform 214.

Server platform 214 may include one or more microprocessors, memory, storage devices, network interface cards, and/or other hardware components for server-side computing. In one implementation, the hardware components may collectively provide computational resources on which the components (e.g., programs, objects, modules, etc.) of web services 106 may be installed and executed.

Depending on the implementation, environment 100 may include additional, fewer, different, or a different arrangement of components than those illustrated in FIG. 2. For example, in a different embodiment, environment 200 may include millions of user devices and/or additional networks. In another example, although not indicated in FIG. 2, mobile device 210 and 212 may be in close proximity (e.g., sales rep that uses mobile device 210 and a customer that uses mobile device 212 may be in the same room).

Figure 3:
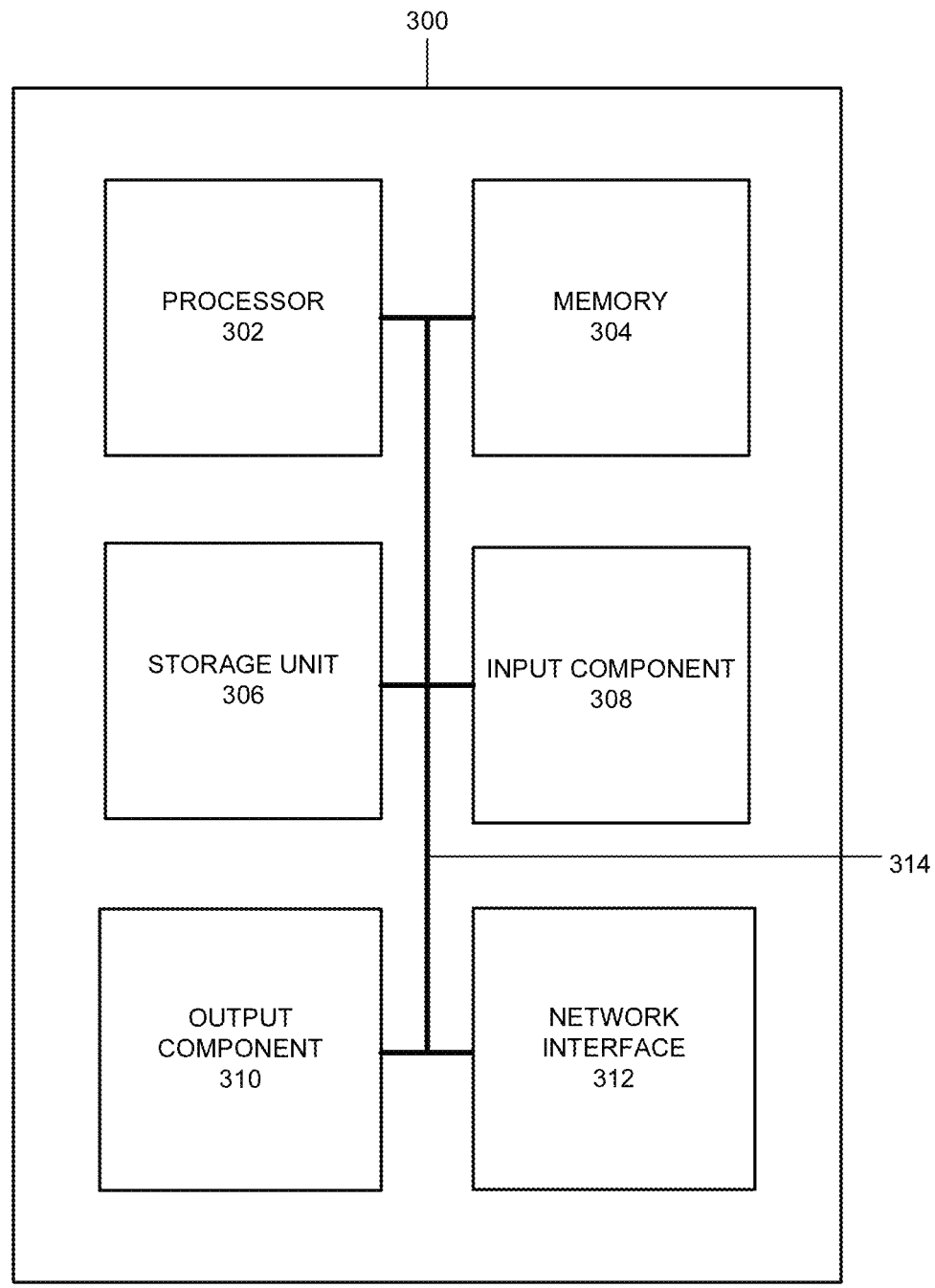
FIG. 3 illustrates exemplary components of network devices of FIG. 1 according to one implementation.

FIG. 3 is a block diagram of exemplary components of a network device 300. Network device 300 may correspond to or be included in any of the devices and/or components illustrated in FIG. 2 (e.g., mobile devices 210 and 212 and server platform 214).

As shown, network device 300 may include a processor 302, memory 304, storage unit 306, input component 308, output component 310, network interface 312, and communication path 314. In different implementations, network device 300 may include additional, fewer, different, or different arrangement of components than the ones illustrated in FIG. 3. For example, network device 300 may include line cards, modems, etc.

Processor 302 may include a processor, a microprocessor, an Application Specific Integrated Circuit (ASIC), a Field Programmable Gate Array (FPGA), programmable logic device, chipset, application specific instruction-set processor (ASIP), system-on-chip (SoC), central processing unit (CPU) (e.g., one or multiple cores), microcontrollers, and/or other processing logic (e.g., embedded devices) capable of controlling device 300 and/or executing programs/instructions.

Memory 304 may include static memory, such as read only memory (ROM), and/or dynamic memory, such as random access memory (RAM), or onboard cache, for storing data and machine-readable instructions (e.g., programs, scripts, etc.).

Storage unit 306 may include a floppy disk, CD ROM, CD read/write (R/W) disk, optical disk, magnetic disk, solid state disk, holographic versatile disk (HVD), digital versatile disk (DVD), and/or flash memory, as well as other types of storage device (e.g., Micro-Electromechanical system (MEMS)-based storage medium) for storing data and/or machine-readable instructions (e.g., a program, script, etc.). Storage unit 306 may be external to and/or removable from network device 300. Storage unit 306 may include, for example, a Universal Serial Bus (USB) memory stick, a dongle, a hard disk, off-line storage, a Blu-Ray® disk (BD), etc. Storage unit 306 may store data, a copy of software, an operating system, application, and/or instructions.

Depending on the context, the term "memory," "storage," "storage device," "storage unit," and/or "medium" may be used interchangeably. For example, a "computer-readable storage device" or "computer-readable medium" may refer to both a memory and/or storage device.

Input component 308 and output component 310 may provide input and output from/to a user to/from device 300. Input/output components 308 and 310 may include a display screen, a keyboard, a mouse, a speaker, a microphone, a camera, a DVD reader, USB lines, and/or other types of components for obtaining, from physical events or phenomena, to and/or from signals that pertain to device 300.

Network interface 312 may include a transceiver (e.g., a transmitter and a receiver) for network device 300 to communicate with other devices and/or systems. For example, via network interface 312, network device 300 may communicate over a network, such as the Internet, an intranet, a terrestrial wireless network (e.g., a WLAN, WiFi, WiMax, etc.), a satellite-based network, optical network, etc. Network interface 312 may include a modem, an Ethernet interface to a LAN, and/or an interface/connection for connecting device 300 to other devices (e.g., a Bluetooth interface).

Communication path 314 may provide an interface through which components of device 200 can communicate with one another.

Network device 300 may perform the operations described herein in response to processor 302 executing software instructions stored in a non-transient computer-readable medium, such as memory 304 or storage device 306. The software instructions may be read into memory 304 from another computer-readable medium or from another device via network interface 312. The software instructions stored in memory 304 or storage device 306, when executed by processor 302, may cause processor 302 to perform processes that are described herein.

For example, when network device 300 is implemented as mobile device 210, programs running on browser 102-1 of mobile device 210 may direct mobile device 210 to establish a network connection to web services 106 hosted on server platform 214, to retrieve sales-related information. In another example, programs running on browser 102-2 of mobile device 212 may cause mobile device 212 to obtain customer information (e.g., address, phone number, etc.) and/or payment information from the customer that operates mobile device 212.

Figure 4:
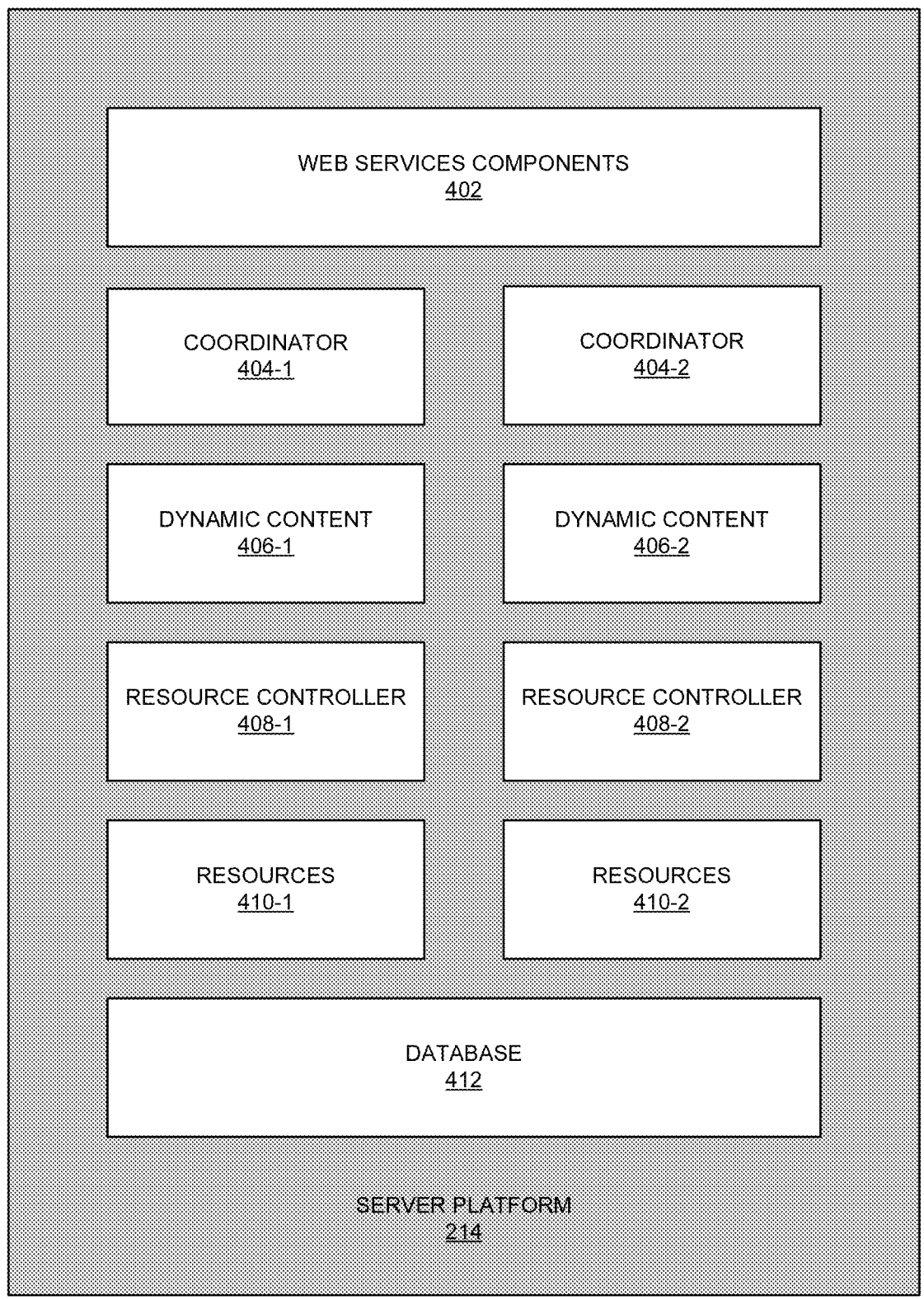
FIG. 4 illustrates exemplary functional components of the server platform according to one implementation.

FIG. 4 illustrates exemplary functional components installed on exemplary server platform 214. As shown, server platform 214 may include web services components 402, coordinators 404-1 and 404-2, dynamic contents 406-1 and 406-2, resource controllers 408-1 and 408-2, resources 410-1 and 410-2, and a database 412. Although server platform 214 may include additional components, for simplicity, they are not illustrated (e.g., operating system, transport control protocol (TCP)/Internet Protocol (IP) stack, etc.).

Web services components 402 may include, for example, web servers (e.g., Apache web server, Microsoft™ Internet Information server, Google™ Web server, etc.), web containers (e.g., Tomcat, Geronimo, GlassFish, IBM WebSphere Application server, Microsoft™ NET framework components, etc.), etc. Web services components 402 may provide software infrastructure for rendering web services to clients (i.e., browsers).

According to one implementation, when web services components 402 receives http requests from coordinator 104-1/104-2, web services components 402 maps them onto method calls (e.g., Java method calls) of resource controller 408-1/408-2. Similarly, when resource controller 408-1/408-2 provides a response to a method call, web services components 402 converts the response into an http message and forwards it to the proper destination (e.g., mobile device 210/212).

Coordinators 404-1 and 404-2 may include copies of programs (e.g., scripts, components, or any other types of executable code) that are provided to mobile devices 210 and 212 and used to create coordinator instances 104-1 and 104-2, respectively. Each of coordinators 404-1 and 404-2 may include instructions for obtaining tokens as preconditions for performing tasks of a procedure and for providing other tokens to indicate completions of tasks to the other coordinator. Depending on the implementations, coordinators 404-1 and 404-2 may be implemented as scripts (e.g., Java scripts) that can run on interpreters on browsers (e.g., JavaScript engines).

Dynamic contents 406-1 and 406-2 may each include Java server pages, Active server pages, Java servlets, and/or other content template and code combinations used to generate contents for browsers 102-1 and 102-2 on mobile devices 210 and 212 in response to coordinator 104-1/104-2 actions. For example, when coordinator 104-2 successfully obtains a token from web services 106, coordinator 104-2 may request web services components 402 to provide content generated from portions of dynamic content 406-2.

Resource controller 408-1/408-2 may include server components for receiving method calls (translated from https requests from mobile devices 210 and 212,) and for dispensing instantiated resource 410-1/410-2 objects in response to the calls. Objects returned by resource controller 408-1/408-2 may be converted into http responses.

In one example scenario, assume that content (i.e., a web page) is loaded onto browser 102-1 on mobile device 210 in response to a coordinator 104-1 request, and that the user of mobile device 210 interacts with the web page. Through the interaction, the user (e.g., a sales rep, a customer, etc.) causes browser 102-1 to make http requests to web services components 402. In response, web services components 402 map the http calls to methods of resource controller 408-1 (e.g., methods of a class) and invoke the methods to obtain, modify, or store resource 410-1 objects. If there is a returned resource object from a method call, then the object is converted into a http response which is forwarded to mobile device 210.

Resources 410-1 and 410-2 may include objects representing information that may be accessed (and/or eventually returned as an http response to mobile devices 210 and 212), modified, and/or stored at database 412. In addition, resources 410-1 and 410-2 may include instantiated objects of helper classes. In one implementation, resource controller 408-1/408-2 and resources 410-1/410-2 may be implemented as Java Representational State Transfer (RESTful) services.

With RESTful services, web requests from mobile device 210/212 are converted into Java method calls to resource controllers 408-1 and 408-2. Any values returned from the method calls are converted into https responses which are forwarded to mobile devices 210 and 212.

Database 412 may include information related to customers, sales rep, particular state information associated with a transaction, product information, service information, etc. In one implementation, database 412 may be accessed through standard database interface calls (e.g., SQL calls).

In one implementation, database 412 may be accessed or modified through resource controller 408 and resources 410. Http requests from mobile devices 210 and 212 for items in database 412 are first mapped to the methods of request controller 408, and the methods access database 412. Information thus accessed from database 412 through the methods may be forwarded to mobile device 210/212 as part of http responses.

Depending on the implementation, server platform 214 may include additional, fewer, different, or a different arrangement of components than those illustrated in FIG. 4. For instance, some components may replace resource controller 408-1/408-2 and resources 410-1/410 with a different API layer between database 412 and web service components 402.

Furthermore, although FIG. 4 illustrates components that are associated with only two different types of user roles (i.e., coordinator 404-1, dynamic content 406-1, resource controller 408-1, and resources 410-1 for the browser on mobile device 210 and coordinator 404-2, dynamic content 406-2, resource controller 408-2, and resources 410-2 for the browser on mobile device 212), server platform 214 may include components for servicing three, four, or more types of user roles. In such an implementation, coordinators 404-1 through 404-m (m>1) may be interdependent. Each coordinator 404-n may obtain tokens from and send tokens to other coordinators 404 through web services 106 for orderly performances of the processes by coordinators 404 on different mobile devices.

FIGS. 5A through 8B are directed to applying concepts illustrated in FIGS. 1-4 to telesales. In contrast to typical telesales that involve the use of portable Point-of-Sales (POS) devices (e.g., tablet computers, smart phones, etc.) by sales reps, implementations of FIGS. 5A-8B provide well-tailored sales information not only to sales reps, but also product/purchase information to customer devices. This leads to enhanced customer purchase experience; added business value to the sales organization; increased security during payment processes in telesales; and mechanisms for convenient customer feedback.

Figure 5A:
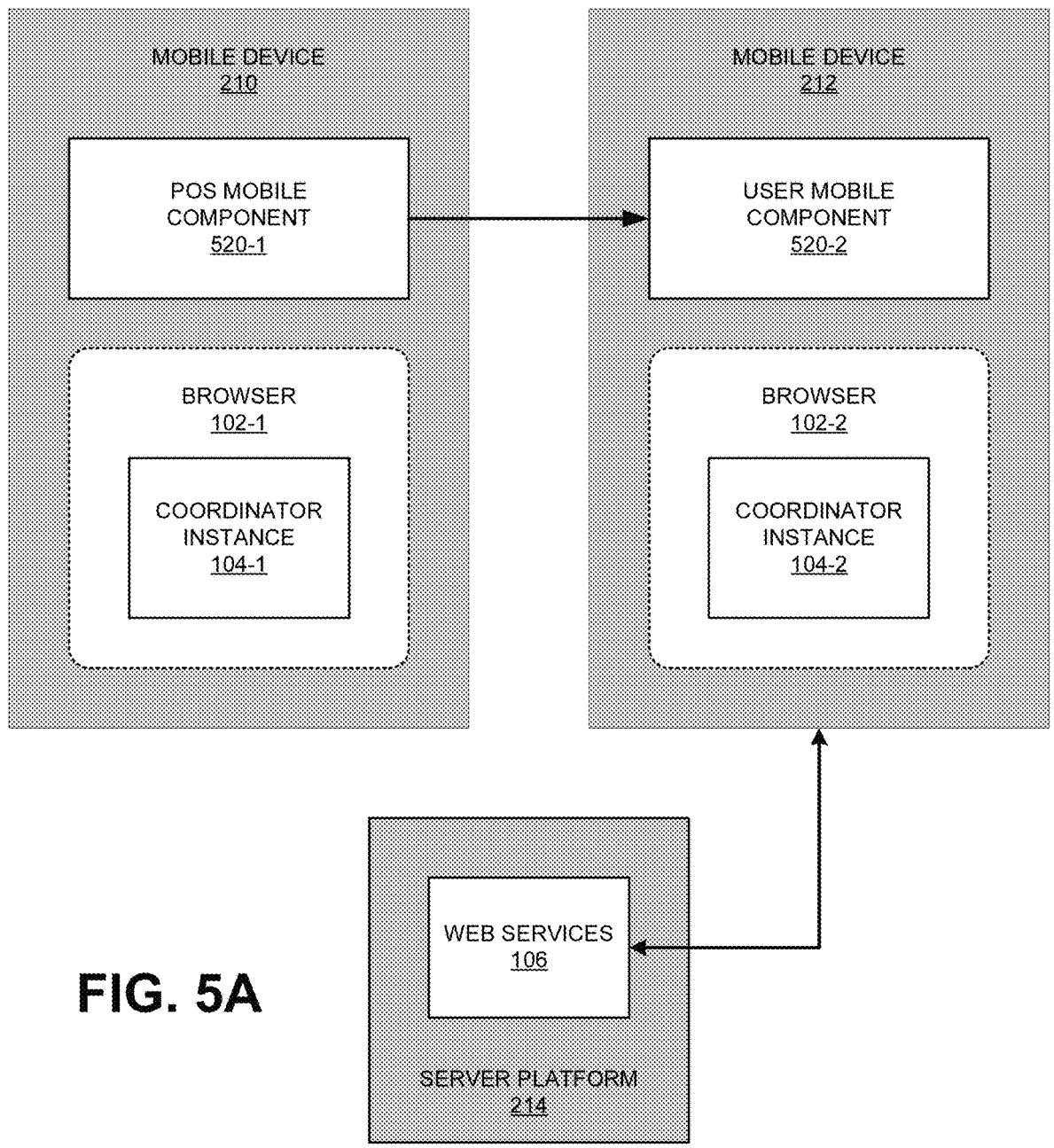
FIG. 5A illustrates flow of messages between functional components of the mobile devices of FIG. 1 and the server platform of FIG. 2 in loading the coordinators of FIG. 4 onto the mobile devices of FIG. 2.

FIG. 5A illustrates a flow of messages between functional components of mobile device 210, mobile device 212, and server platform 214 for loading coordinators 104-2 onto mobile device 212. Assume that a sales rep for entity X is interacting with a customer in person. The customer expresses an interest in a new phone. The sales rep asks the customer if he could provide product information to the customer's smart phone (i.e., mobile device 212), and when the customer responds affirmatively, the sales rep uses mobile device 210 to establish a communication with mobile device 212 over web services 106. In different scenarios, communication can be initiated by mobile device 212 rather than mobile device 210.

Figure 5B:
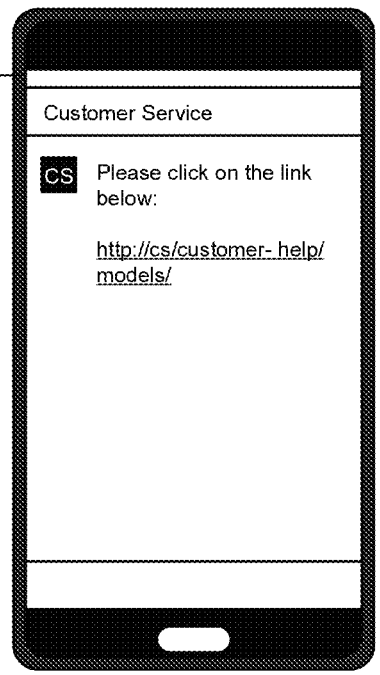
FIG. 5B illustrates exemplary screen shots of the mobile devices of FIG. 1 during the flow of messages depicted in FIG. 5A.
Figure 5B:
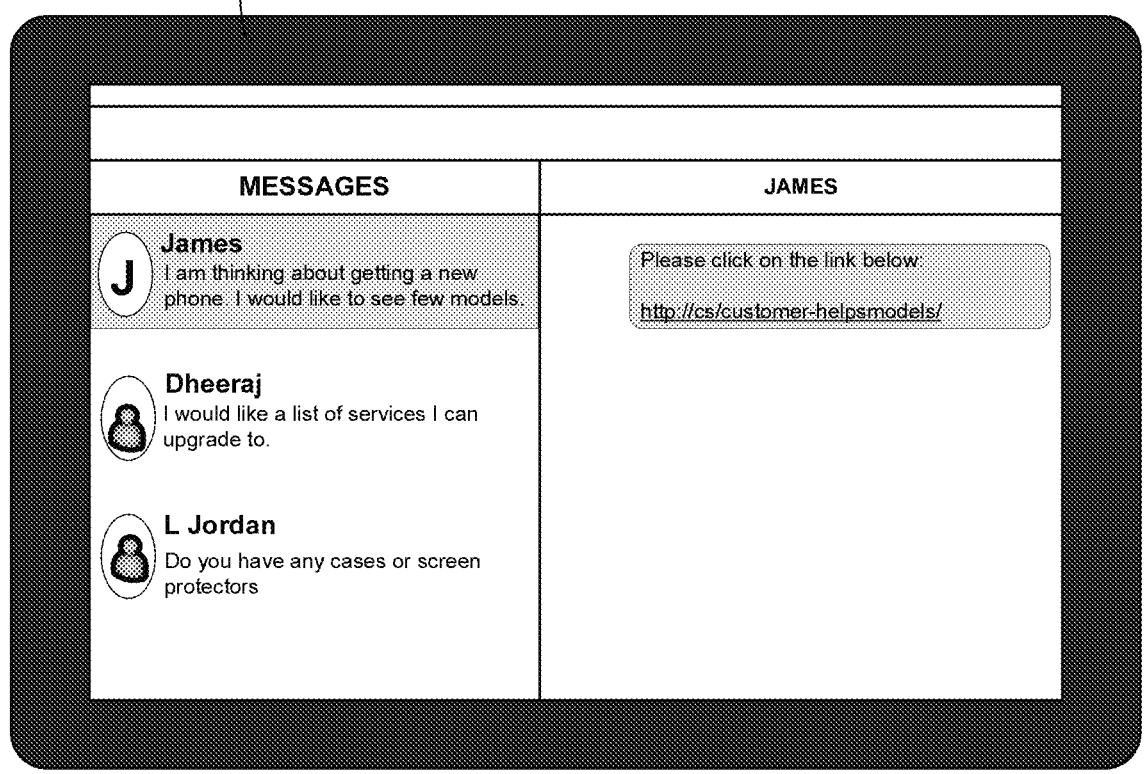

As further shown in FIG. 5A, the communication between mobiles devices 210 and 212 takes place between a POS mobile component 520-1 and a user mobile component 520-2 of mobile devices 210 and 212, respectively. Each POS mobile component 520-1 and user mobile component 520 may be a texting application, a browser plug-in (part of a browser), etc. During the communication, POS mobile component 520-1 provides user mobile component 520-2 with a link to download coordinator 404-2 for facilitating a purchase. FIG. 5B illustrates screen shots of mobile devices 210 and 212 after POS mobile component 520-1 provides the link to user mobile component 520-2.

When a user activates the link displayed through user mobile component 520-2, browser 102-2 makes an http request to web services 106, which fetches a copy of coordinator 404-2 and provides it to browser 102-2 on mobile device 212. The copy of coordinator 404-2 is then used to instantiate coordinator instance 104-2 in browser 102-2.

As shown, browser 102-1 on mobile device is already open and has its own coordinator 104-1. Coordinator 104-1 may already have been instantiated through some actions of the sales rep, who may have caused mobile device 210 to download a copy of coordinator 404-1 and create coordinator instance 104-1 prior to his interaction with the customer.

Figure 6:
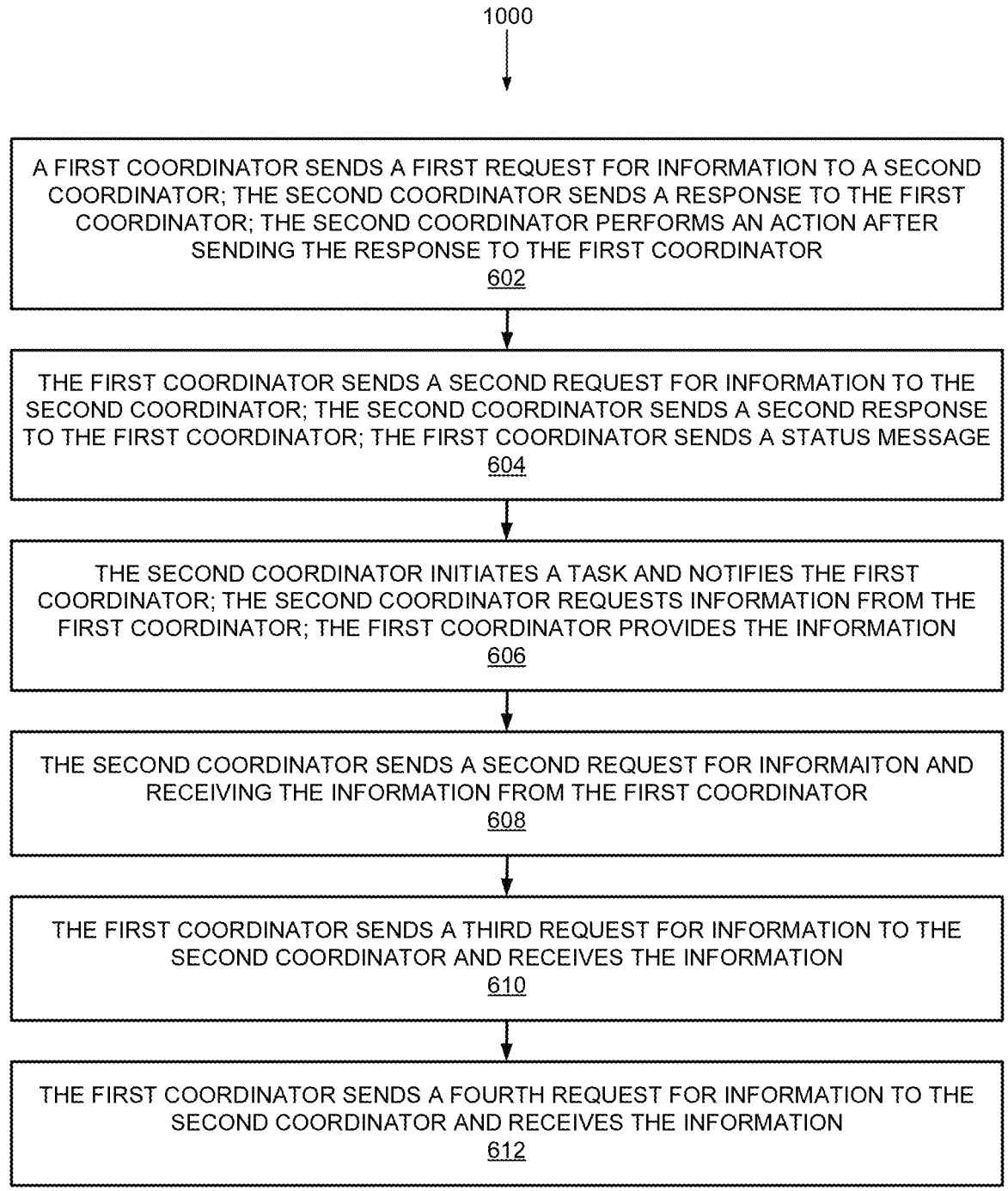
FIG. 6 is a flowchart of a process that takes place after the coordinators of FIG. 1 are instantiated on their respective mobile devices in accordance with the example of FIG. 5A.
Figure 7:
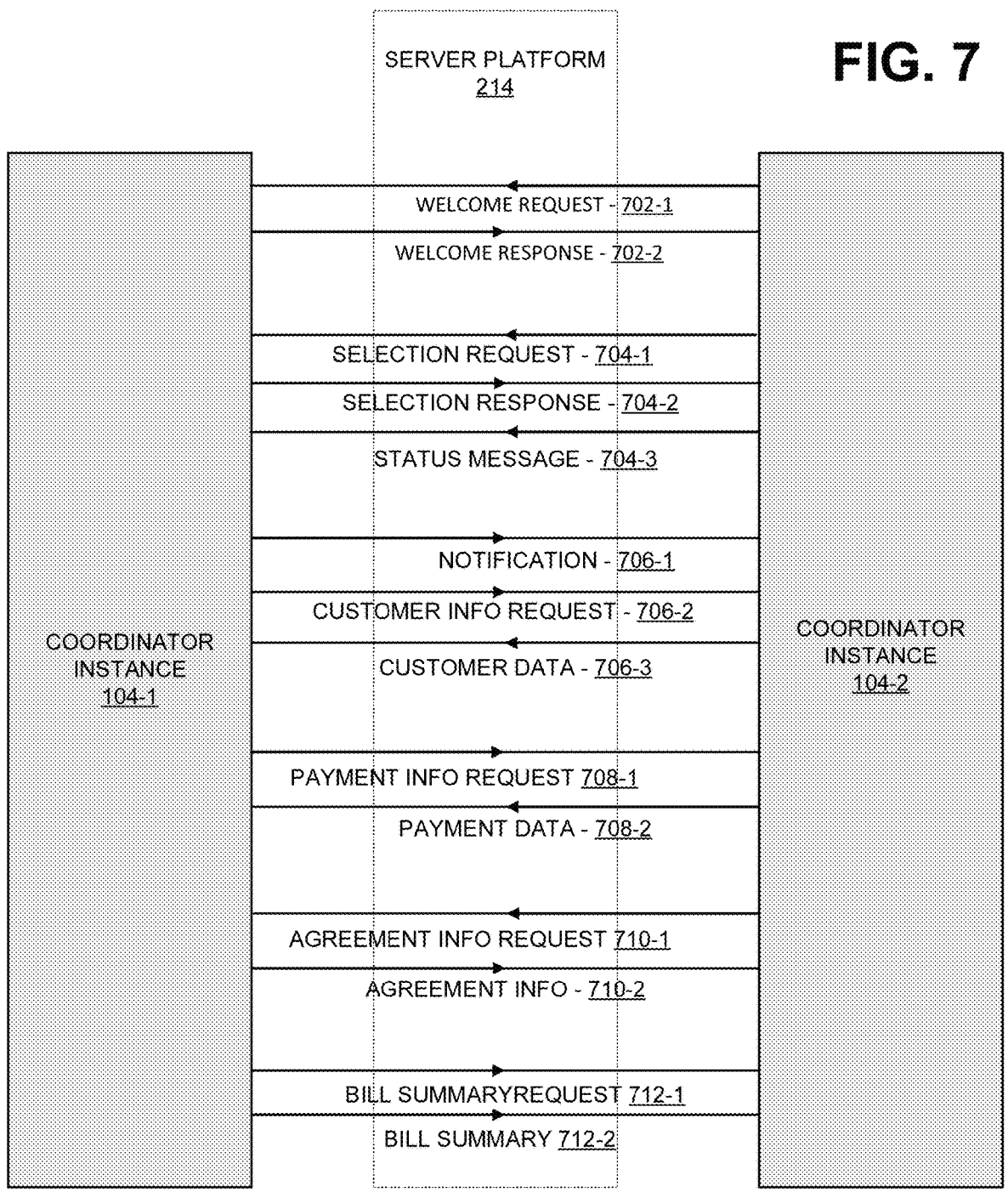
FIG. 7 is diagram illustrating a flow of messages between functional components of the mobile devices of FIG. 2 over the server platform of FIG. 2 after the coordinators of FIG. 4 have been uploaded onto the mobile devices of FIG. 2.
Figure 8A:
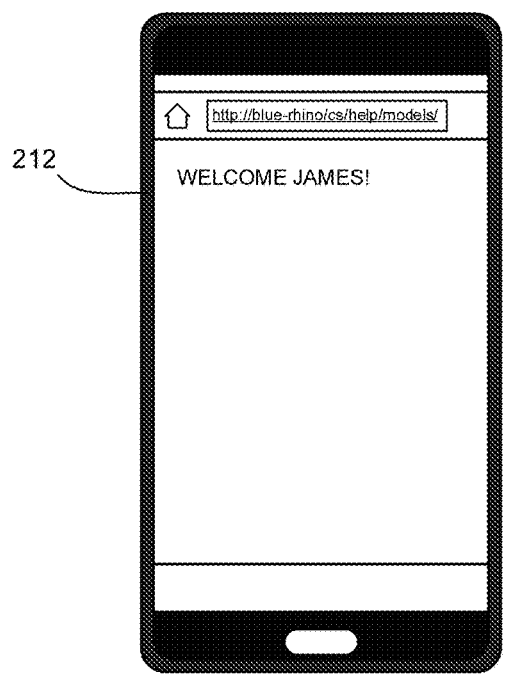
FIGS. 8A and 8B illustrate exemplary screen shots of the mobile devices of FIG. 1 during the process of FIG. 6.
Figure 8A:
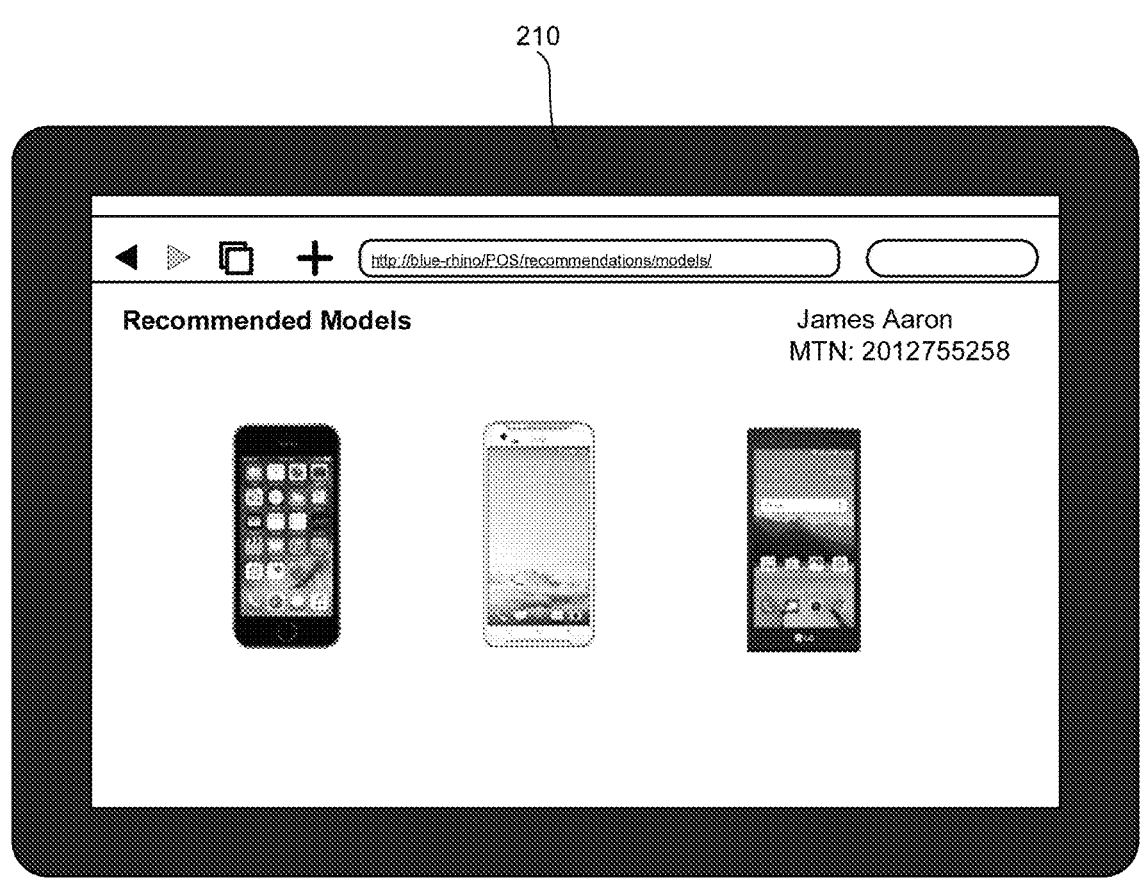
Figure 8B:
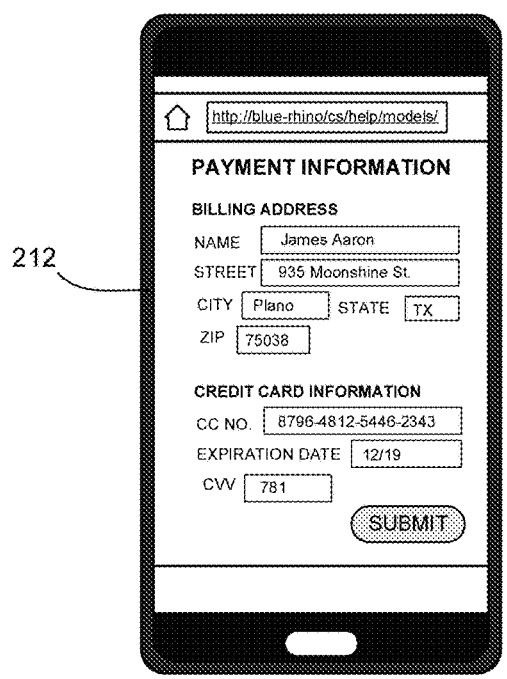
Figure 8B:
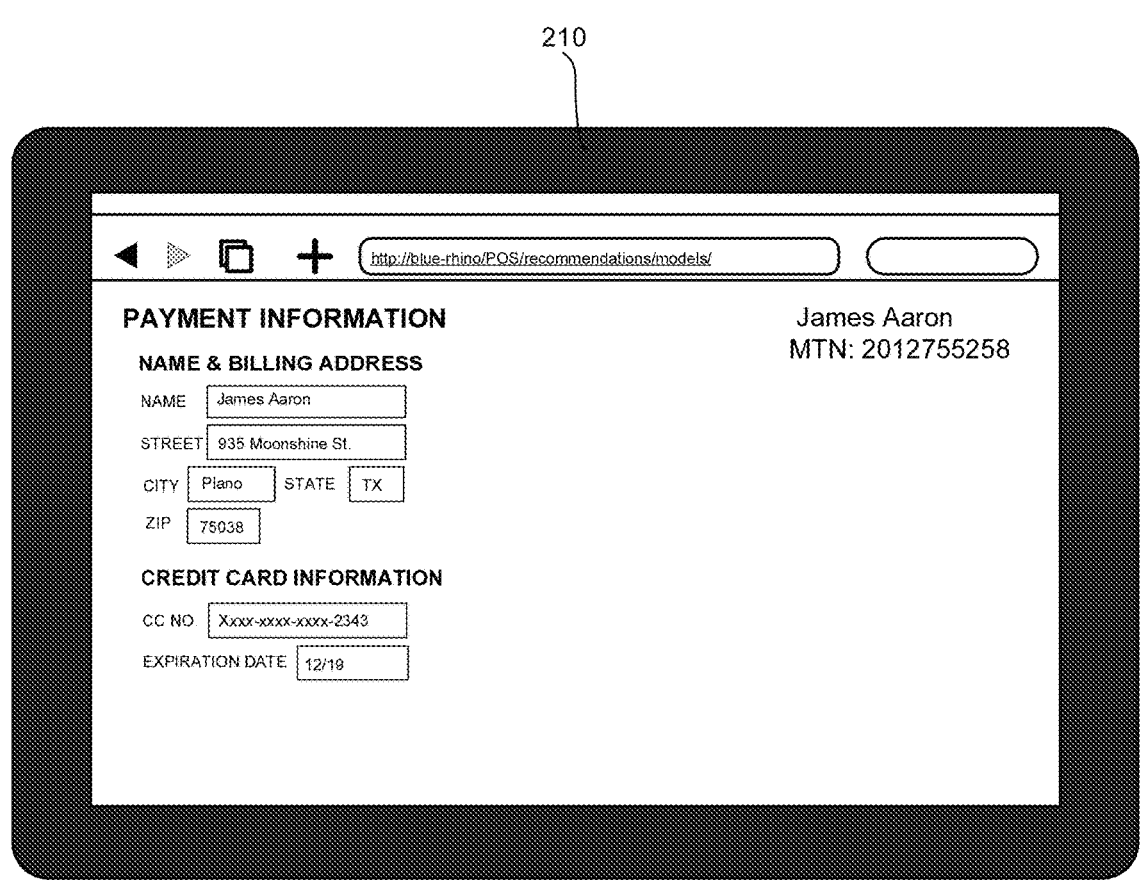

FIG. 6 is a flowchart of a process 600 that occurs after coordinators 104-1 and 104-2 are instantiated on their respective mobile devices 210 and 212 for the telesales example of FIG. 5A. During process 600, coordinators 104-1 and 104-2 exchange messages over server platform 214. FIG. 7 is a diagram illustrating the flow of such messages between coordinators 104-1 and 104-2 over server platform 214 for the telesales example of FIG. 5. FIGS. 8A and 8B illustrate exemplary screen shots of mobile devices 210 and 212 during process 600.

Process 600 may include a first coordinator sending a first request for information to a second coordinator (block 602). As illustrated in FIG. 7, coordinator 104-2 sends a welcome request 702-1 to coordinator 104-1 over server platform 214. When any message is sent "over server platform 214," although not indicated in FIG. 7, the message is posted to server platform 214 at a specific location designated by a Universal Resource Identifier (URI) and picked up by the recipient (i.e., one of coordinators 104-1 and 104-2) at the URI (e.g., via a GET http message). Each messaging illustrated in FIG. 7 thus implicitly involves server platform 214 as an intermediary.

In FIG. 7, a coordinator that is looking to pick up a message polls server platform 214 while waiting for the message. In other implementations, coordinators 104-1 and 104-2 may not use the polling method, but may communicate in other ways (e.g., server platform 214 pushes the message to the recipient coordinator).

To ensure the orderly execution of a process P1 by coordinator 104-1 and a process P2 by coordinator 104-2, each message sent from coordinator 104-1 to coordinator 104-2 (or vice versa) includes a particular token (e.g., a recognizable symbol or a string). When the recipient (i.e., coordinator 104-1 or 104-2) detects the particular token, the recipient may perform a task whose performance precondition includes receipt of the particular token.

For example, assume that coordinator 104-2 sends a welcome request in JavaScript Object Notation (JSON) format: {MTN: 2012755358, currentAction: "start"}. When coordinator 104-1 receives the request and detects the token "start" (as the value of currentAction), coordinator 104-1 knows that coordinator 104-2 wants to begin servicing the customer. Accordingly, coordinator 104-1 prepares an appropriate response.

In one implementation, to prepare the response, coordinator 104-1 may make an http request to web services 106 to obtain customer information, conveying the Mobile Telephone Networks (MTN) number provided in welcome request 706-1. In response, web services components 402 may translate the request to a Java method (e.g., via RESTful services) and call the method. The method may look up customer information in database 412 and return a resource object. Web services 106 may translate the returned object into an http response.

Process 600 includes the second coordinator sending a response to the first coordinator (block 602). Continuing with the preceding example, coordinator 104-1 forwards the response (702-2) to coordinator 104-2. As already explained with respect to any message exchanged between coordinators 104-1 and 104-2, welcome response 702-2 is conveyed over server platform 214, and therefore, welcome message 702-2 is handled by coordinators 104-1 and 104-2 and server platform 214 in accordance with synchronization steps described above. For simplicity, further descriptions of server platform 214's involvement in coordinator messaging are omitted.

In the above example, assume that welcome response 702-2 is the following JSON message:

```
{
    MTN: 2012755358,
    firstName: James,
    lastName: Aaron,
    dataAvailable: true,
    nextAction: "welcome"
}.
```

When coordinator 102-2 receives response 702-2, coordinator 102-2 displays a welcome message. FIG. 8A illustrates screen shots of mobile device 212 displaying the welcome message for James. The name James, which is displayed by coordinator 104-2, is extracted from welcome response 702-2.

In a different embodiment, block 602 of process 600 may include additional tasks/steps in which coordinator 104-2 obtains the customer's language preference (in case the customer is multilingual), either by directly querying the customer or by looking up the customer's preferences (if the customer has an account that coordinator 104-2 can query). Because the information provided to the customer through mobile device 212 can be different from information shown to the sales rep, it is possible to present, to the customer, product information in accordance with the customer's preferences/background.

Once the customer's preference is determined, coordinator 104-2 can present any further information (i.e., in blocks 602-614) based on the preferences. If the customer is comfortable with a particular language, allowing the customer to interact in that language reduces the chances of the customer entering incorrect information (e.g., the customer may not comprehend other languages).

Returning to FIG. 6, process 600 may include the second coordinator performing an action after sending a response (block 602). For example, in addition to sending welcome response 702-2, coordinator 104-1 may request the sales rep to recommend a device for the customer. FIG. 8A shows a number of smart phones from which the sales rep may select a device that he may recommend. When the sales rep selects one of the devices shown, coordinator 104-1 stores the selection at web services 106 and waits for a message from coordinator 104-2.

Process 600 further includes the first coordinator sending a second request for information (block 604). At mobile device 212, after coordinator 104-2 displays the welcome message for a particular duration of time, coordinator 104-2 dispatches a request to coordinator 104-1 to provide a device recommendation. That is, coordinator 104-2 sends a device information request (704-1):

{MTN: 2012755358, currentAction: welcome}

Coordinator 104-2 knows to set the current action in request 704-1 to the token "welcome," because the welcome response 702-2 included the token "welcome" as the value of the next action parameter.

When coordinator 104-1 receives device information request 704-1, coordinator 104-1 identifies the previously selected device by looking up it in database 412, using the MTN as the key. The lookup is necessary because coordinator 104-1 does not retain any state information from its previous message exchange with coordinator 104-2. Upon identifying the selected device, coordinator 104-1 obtains detailed information for the selected device from web services 106. In one embodiment, using the obtained information, coordinator 104-1 forms a selection response 704-2:

```
{
    MTN: 2012755358,
    deviceName: Apple iPhone 7 Black 64GB,
    deviceImage: apple%5Fiphone%5FS%5Fblack,
    devicePrice: 749.99,
    dataAvailable: True,
    nextAction: deviceInfo
}
```

Returning to FIG. 6, process 600 includes the second coordinator sending a second response (block 604). Continuing with the above example, coordinator 104-1 sends the selection response to coordinator 104-2.

Process 600 further includes the first coordinator sending a status message (block 604). At mobile device 212, when coordinator 104-2 receives device information 704-2, coordinator 104-2 displays the device information, and sends a message (704-3):

{MTN: 2012755358, currentAction: deviceInfo}.

The token "deviceInfo" indicates to coordinator 104-1 that coordinator 104-3 may start a next task.

Process 600 further includes the second coordinator initiating a task and notifying the first coordinator (block 606). Continuing with the above example, coordinator 102-1 displays a form for showing customer information to the sales rep and indicates to coordinator 104-2 that obtaining customer information is the next action. That is, coordinator 104-1 sends customer notification 706-1. The message may include, for the above example:

```
{
    MTN: 2012755358,
    dataAvailable: true,
    nextAction: customerInfo
}
```

By detecting dataAvailable flag having "true" as its value, coordinator 104-2 loads a customer information form (different from the customer information form displayed on mobile device 210 by coordinator 104-1) onto browser 102-2.

Returning to FIG. 6, process 600 includes the second coordinator requesting information for the initiated task (block 606). Returning to the example above, coordinator 104-1 sends a customer information request 706-2:

{MTN: 2012755358, action: customerInfo}.

Process 600 further includes the first coordinator providing the requested information (block 606). When the customer fills out the form and submits the information via coordinator 104-2, coordinator 104-1 receives customer data 706-3 from coordinator 104-2 and displays customer data 104-2. The customer data 706-3 may include:

```
{
    firstName: James
    lastName: Aaron
    email: jAaron@test.com
    streetNumber: 435
    streetName: HIDDEN
    city:   Ridge,
    zip:    75038,
    state:  TX,
    ssn: xxx-xx-2134,
    dataAvailable: true
}
```

Process 600 further includes the second coordinator sending a second request for information and receiving the information from the first coordinator (block 608). For example, when coordinator 210 is ready (e.g., a sales rep is ready to view payment information), coordinator 104-1 loads a payment information form and sends a payment information request 708-1 to coordinator 104-2. Coordinator 104-2 loads in another version of payment information form. When the customer submits payment data 708-2, coordinator 104-2 posts the data to web services 106. In the example, payment data 708-2 includes:

```
{
    ccName: James Aaron
    streetAddress: 935 Moonshine Street,
    zip: 75038
    ccNumber: "xxxx-xxxx-xxxx-2343",
    ccExpiry: 12/19,
    CCV: xxx
}
```

At mobile device 210, coordinator 104-1 receives and displays payment data 708-2. FIG. 8B illustrates the screen shots of mobile devices 210 and 212 during the performance of block 608.

As shown, mobile device 210 displays information different from that shown on mobile device 210 in order to address potential security concerns that customers may have about revealing their personal information. For example, in FIG. 8B, although the customer's mobile device 212 shows CCV number, mobile device 210 does not show the CCV number. In another example, in FIG. 8B, customer's mobile device 212 shows the full credit card number, while mobile device 210 shows only the last four digits of the customer's credit card number. That is, the customer can enter highly sensitive information that will be encrypted and pushed to their appropriate destinations (e.g., mobile device 210) without the intervention from the sales rep. Customer does not need to share sensitive information with the sales rep, such as a social security number, credit card number, etc.

Process 600 includes the first coordinator sending a third request for information; and the second coordinator providing the information (block 610). In the example, at mobile device 212, after the submission of payment data 708-2, coordinator 104-2 sends a customer agreement information request 710-1 to coordinator 104-1, which then responds with customer agreement information 710-2. When coordinator 104-2 receives the agreement, coordinator 104-2 displays the customer agreement on browser 102-2.

Process 600 includes the first coordinator sending a fourth request for information and the second coordinator providing the information (block 612). In the example, at mobile device 212, coordinator 104-2 sends a bill summary request 712-1 to coordinator 104-1, which responds with a bill summary 712-2. Coordinator 104-2 receives and displays bill summary 712-2 via browser 102-2.

Depending on the implementation, process 600 may include additional, fewer, different, or a different arrangement of blocks than those illustrated in FIG. 6. For example, process 600 may include a block for providing customer feedback after the order is completed. Such feedback may be invaluable in improving the product/services, as well as the sales/purchase process. In today's POS sales process, it is difficult for the customers to provide a direct feedback.

In process 600, as evident from the above, the sales rep and customer interact not only in-person, but also through their mobile devices 210 and 212. Consequently, the sales transaction results in greater customer engagement, in contrast to today's POS telesales. Typically, a sales rep places the order using a mobile device, and then the customers are shown the order details when an order review page comes up on the sales rep's device. There is not much customer engagement while the sales rep is placing the order or is performing another activity on his mobile device.

In process 600, with respect to the customer ordering a particular product, there is little or no guesswork. In contrast, with a typical POS telesales, in which the customer may wonder what the ordered device looks like, or whether the sales rep entered the correct information. In process 600, the customer is provided with information (e.g., image of the product, form for filling out for the customer, etc) that the customer can immediately view and verify.

Although not illustrated, when the customer adds or removes additional items for purchase, the customer is shown the changes in the total charges. The customer can easily view any additional costs or savings without having to request the sales rep to provide the new total. Again, this further eliminates guesswork on the customer's part.

In some embodiments, it is possible to configure coordinators 104-1 and 104-2 to display advertisements when certain information is shown to the customer. For example, when the welcome message is displayed or when data is auto-populating the display screen (e.g., device information, order details, etc), coordinators 104-1 and 104-2 may present advertisements (e.g., from the sales organization, network service provider, etc.). Similarly, coordinators 104-1 and 104-2 may be configured to enhance the purchase process. The purchase process may be made more attractive, by showing promotions about the products/items being ordered.

In some implementations, coordinators 104-1 and 104-2 may suggest alternate products/services (i.e., up-sell or cross-sell products/services) that better fit the customer needs. In today's POS telesales, as there is no mechanism to automate such a cross-sell or up-sell, and the process relies on sales reps' knowledge of different products and services.

Today's POS telesales are quite different from online transactions. With the above architecture, however, it is possible to make online sales channels and the POS telesales be part of a single sales/purchase process. For example, customers may be presented with cross-sell and/or up-sell product images/icons with links to online channels. If the customers click on any of the product images, the customers may be shown online sites where the customers can make additional purchases. That is, an order that is initiated during a POS telesales in accordance with the above description may result in sales at online channels.

In this specification, various preferred embodiments have been described with reference to the accompanying drawings. It will be evident that modifications and changes may be made thereto, and additional embodiments may be implemented, without departing from the broader scope of the invention as set forth in the claims that follow. The specification and drawings are accordingly to be regarded in an illustrative rather than restrictive sense.

For example, system 100 may be adapted to a tutor and a student. Although the tutor and the student may share some information (e.g., homework assignment), information displayed on the tutor's mobile device (e.g., teaching material) may be different than information shown on a mobile device of the student. Because the tutor and the student interact in-person, a process that is running on the mobile device of the tutor (e.g., a program for generating multiplication problems and their answers) should be synchronized to a process that is running on a mobile device of the student (e.g., a program for generating multiplication problems without showing the answers).

In the above, while a series of blocks have been described with regard to the processes illustrated in FIG. 6 and messages in FIG. 7, the order of the blocks and messaging may be modified in other implementations. In addition, non-dependent blocks may represent blocks that can be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

To the extent the aforementioned embodiments collect, store or employ personal information provided by individuals, it should be understood that such information shall be used in accordance with all applicable laws concerning protection of personal information. The collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, block, or instruction used in the present application should be construed as critical or essential to the implementations described herein unless explicitly described as such. Also, as used herein, the articles "a", "an" and "the" are intended to include one or more items. Further, the phrase "based on" is intended to mean "based, at least in part, on" unless explicitly stated otherwise.

What is claimed is:

1. A method comprising:
    sending, by a web server, a first coordinator to a first browser of a first mobile device, wherein the first coordinator is a set of instructions executable by the first browser;
    sending by the web server, a second coordinator to a second browser of a second mobile device, wherein the second coordinator is a set of instructions executable by the second browser;
    wherein the first coordinator, when executed by the first browser, instructs the first browser to:
        send a first request for information to the second browser, over the web server, wherein the first request includes a first token,
        wait until the requested information is received from the second coordinator over the web server, wherein the requested information includes a next token,
        when the requested information is received from the second coordinator, perform a first action based on the requested information received from the second coordinator;
    wherein the second coordinator, when executed by the second browser, instructs the second browser to:
        when the first request is received from the first coordinator over the web server, send the requested information to the first coordinator; and
    wherein the first coordinator and the second coordinator are synchronized to one another based on the first token.

2. The method of claim 1, wherein the first coordinator is implemented as a JavaScript.

3. The method of claim 1, wherein the next token indicates a particular action to be performed by the first coordinator.

4. The method of claim 1, wherein the first request for information includes a Mobile Telephone Networks (MTN) number of the first mobile device.

5. The method of claim 1, wherein the requested information includes one of:
    information about a product that a user of the first mobile device can purchase; or
    information about a user of the first mobile device.

6. The method of claim 1, wherein the first action includes:
    requesting the web server to provide additional data to the first browser.

7. The method of claim 6, wherein the requesting the web server to provide the additional data to the first browser includes dispatching an http request, the method further comprising:
    receiving the http request from the first coordinator;
    converting the http request into a method call;
    receiving a result of the method call;
    converting the result into an http response; and
    forwarding the http response to the first coordinator.

8. The method of claim 1, wherein the first mobile device belongs to a sales rep and the second mobile device belongs to a customer,
    wherein the requested information includes a portion sensitive to the customer, and wherein the first action includes:
    displaying the requested information but hiding the sensitive portion.

9. The method of claim 8, wherein the requested information includes credit card information.

10. The method of claim 1, wherein the first coordinator receives additional information from the second coordinator, and wherein the additional information includes:
    advertisements; or
    promotional information for a product.

11. A non-transitory computer-readable medium, comprising computer-executable instructions, when executed by a processor, cause the processor to:
 send, by a web server, a first coordinator to a first browser of a first mobile device, wherein the first coordinator is a set of instructions executable by the first browser;
 send, by the web server, a second coordinator to a second browser of a second mobile device, wherein the second coordinator is a set of instructions executable by the second browser;
 wherein the first coordinator, when executed by the first browser, instructs the first browser to:
  send a first request for information to the second browser over the web server, wherein the first request includes a first token,
  wait until the requested information is received from the second coordinator over the web server, wherein the requested information includes a next token,
  when the requested information is received from the second coordinator, perform a first action based on the requested information received from the second coordinator;
 wherein the second coordinator, when executed by the second browser instructs the second browser to:
  when the first request is received from the first coordinator over the web server, send the requested information to the first coordinator; and
 wherein the first coordinator and the second coordinator are synchronized to one another based on the first token.

12. The non-transitory computer-readable medium of claim 11, wherein the first coordinator is implemented as a JavaScript.

13. The non-transitory computer-readable medium of claim 11, wherein the next token indicates a particular action to be performed by the first coordinator.

14. The non-transitory computer-readable medium of claim 11, wherein the first request for information includes a Mobile Telephone Networks (MTN) number of the first mobile device.

15. The non-transitory computer-readable medium of claim 11, wherein the requested information includes one of:
 information about a product that a user of the first mobile device can purchase; or
 information about a user of the first mobile device.

16. The non-transitory computer-readable medium of claim 11, wherein the first action includes:
 requesting the web server to provide additional data to the first browser.

17. The non-transitory computer-readable medium of claim 16, wherein the requesting the web server to provide the additional data to the first browser includes dispatching an http request, wherein the processor is further to:
 receive the http request from the first coordinator;
 convert the http request into a method call;
 receive a result of the method call;
 convert the result into an http response; and
 forward the http response to the first coordinator.

18. The non-transitory computer-readable medium of claim 11, wherein the first mobile device belongs to a sales rep and the second mobile device belongs to a customer,
 wherein the requested information includes a portion sensitive to the customer, and wherein the first action includes:
 displaying the requested information but hiding the sensitive portion.

19. The non-transitory computer-readable medium of claim 18, wherein the requested information includes credit card information.

20. The non-transitory computer-readable medium of claim 11, wherein the first coordinator receives additional information from the second coordinator, and wherein the additional information includes:
 advertisements; or
 promotional information for a product.

* * * * *